April 6, 1954

V. N. SMITH ET AL 2,674,696

INFRARED GAS ANALYZER

Filed Nov. 12, 1952

Inventors: Vigo N. Smith
George C. Eltenton
By: [signature]
Their Attorney

Inventors: Vigo N. Smith
George C. Eltenton
By: [signature]
Their Attorney

Patented Apr. 6, 1954

2,674,696

UNITED STATES PATENT OFFICE 2,674,696

INFRARED GAS ANALYZER

Vigo N. Smith, San Leandro, Calif., and George C. Eltenton, Bromborough, England, assignors to Shell Development Company, Emeryville, Calif., a corporation of Delaware Application November 12, 1952, Serial No. 319,968

15 Claims. (Cl. 250—43.5)

This invention relates to the analysis of heteratomic fluid mixtures, and pertains particularly to a system for continuously effecting such analysis, automatically recording the results thereof, and/or automatically controlling the composition, flow rate or other parameters of said gases or mixtures thereof.

The system of the present invention makes use of the principle of selective infra-red absorption, and is particularly suitable for determining, recording and/or controlling the proportions of two or more components in a fluid stream.

If radiant energy E is passed through an absorbing fluid X, an amount $e_x$ of the energy will be removed in the absorption space or cell, the emergent energy being then equal to $E-e_x$. Detector means capable of measuring this energy are thus capable of detecting X in a mixture of absorbing gases and in the presence of a non-absorbing gas N, since $e_x$ varies with the number of molecules of X present in the absorption cell.

In general, however, $e_x$ is a very small fraction of E, so that a detector which is responsive to all wave lengths will be irradiated by a large amount of energy E in the absence of X in the absorption cell, and by only a slightly smaller amount of energy $E-e_x$ in the presence of X therein.

This difficulty can be overcome by irradiating two detectors, one through an absorption cell containing X, and the other through an empty cell, or a cell containing a non-absorbing gas. The difference in the amount of energy received by the two detectors will be $e_x$, and a more sensitive indicating or recording instrument can be applied to the output from the two detecting elements. Although the calibration in this case will vary with the total energy E, since the absorbed energy $e_x$ is a fraction thereof, this additional difficulty can be in turn overcome by using the null principle, that is, by stopping down the energy passing through the empty cell until the energy difference in the two detectors is zero, and then calibrating the action of the optical wedge used for this purpose in terms of concentration of the component X.

In cases where the absorbing component X is present in admixture not only with a non-absorbing medium N, but also with two or more absorbing components Y and Z, having spectra different from that of X, it is essential to provide discrimination, so as to insure that if X is the main component to be measured and/or controlled, then the instrument will respond only to the absorbed energy $e_x$, and not to $e_y$ or $e_z$, to use the method of notation adopted above.

Although discrimination, which must naturally rely on some form of separation of energy into characteristic wave-length regions, can be provided by means of selective filtration, it is the object of this invention to provide such discrimination through selective detection, that is, through the use of selective detectors, since this has the advantage of involving simpler optics and giving a greater sensitivity to changes in ratio brought about by changes of X.

The principle underlying the present invention is therefore as follows:

If the variations of X in the absorption cell are to be determined, and if the total energy susceptible to be absorbed by X is $E_x$, then a detector cell filled with relatively large amounts of X will absorb a substantial portion of the energy $E_x-e_x$ which remains in the beam after $e_x$ has been absorbed in the absorption or sample cell containing the mixture to be analyzed, for example, the gaseous components X, Y and Z. If the gas in the detector cell is pure X, or X admixed with a neutral or non-absorbing gas N, then no other radiation will be absorbed, provided the detector has a highly-reflecting lining. The absorption of this energy $E_x-e_x$ will raise the temperature of the gas and hence the pressure. Therefore, by periodically interrupting the energy radiated by the source, pressure pulses will be initiated in the detector, and the amplitude of said pulses will decrease linearly with increasing $e_x$ and hence with the concentration of X in the sample or absorption cell. These pressure pulses can be detected by means of a microphone, amplified and recorded. By employing two beams of interrupted radiation and two detector cells each provided with a microphone, it is obvious that a ratio of pulses may be measured which is, within reasonable limits, insensitive to source energy variations, and which is more sensitive to variations in X than the ratio of conventional bolometer signals responsive to all wave lengths.

Furthermore, it has been found that a most efficient conversion of the radiant energy to useful energy in the detector cell occurs if a relatively large concentration of a neutral or non-absorbing gas N is present with the absorbing gas or gases, such as the gas components X, Y or Z mentioned hereinabove. Thus, if these absorbing gases are admixed in relatively minor proportions, such as about 10 per cent partial pressure, with relatively major proportions, such as 90 per cent partial pressure, of a diluent non-absorbing gas, such as nitrogen, helium, argon, etc., the overall efficiency of the present system and its discriminating or selective detecting power are so greatly increased that it becomes possible, in some cases, first, to dispense with the use of two detector cells used as a null-balance system, and to obtain accurate results with the use of a system having a single detector cell; and, second, to measure a component such as X in a mixture of X, Y, Z, etc., by means of detector cells containing different concentrations (partial pressures) $X_1$ and $X_2$ of the same gas.

The general objects of this invention may therefore be briefly stated to reside in providing an infra-red gas analyzing and recording and/or controlling system of high sensitivity, stability and discriminating power for a fluid component X having a spectrum sufficiently different for the purpose from those of one or more other components Y, Z, etc., said system being at the same time substantially insensitive to variations in the total pressure of the sample being analyzed, to flow variations, ambient temperature variations, and to normal variations in the total emissive power of the radiation source or sources.

It is the particular object of this invention to provide for the purpose stated an infra-red analysis system of greatly increased sensitivity, wherein the detector cell or cells is or are filled with a relatively minor proportion of the absorbing gas under measurement admixed with a relatively major proportion of a neutral or non-absorbing gas such as nitrogen, helium, argon, etc., the use of argon being particularly advantageous from the point of view of conversion of energy to a useful form. It is, however, fully within the scope of this invention to use a pure absorbing gas without diluent when desired.

These and other objects of the present invention will be understood from the following description taken with reference to the attached drawings, wherein.

Figures 1, 2:
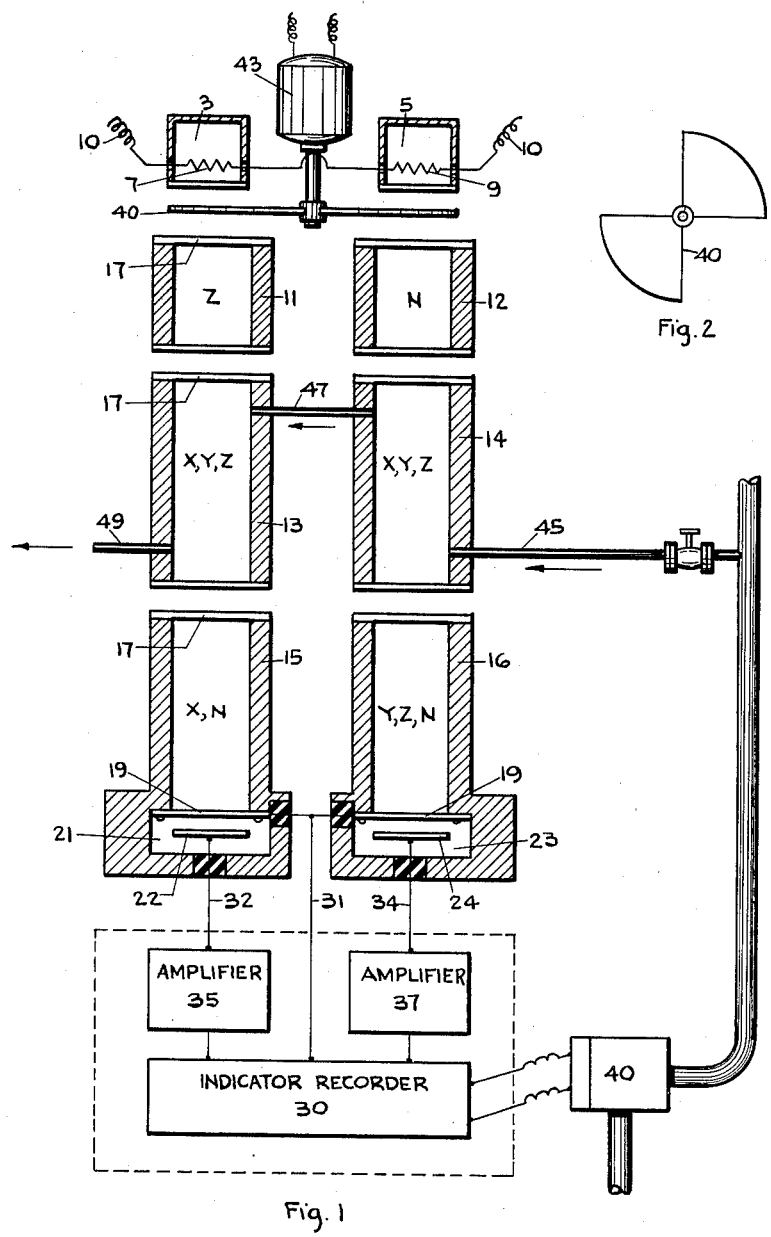
Fig. 1 is a diagram indicating the general arrangement of the parts forming the present system.
Fig. 2 is a view of the light shutter or chopper used in said system.

Referring to Fig. 1, reference numerals 3 and 5 indicate sources of infra-red radiation, such as lights or lamps having filaments 7 and 9, for example, of suitable chrome alloys heated to a proper temperature to emit a desired spectrum of rays by supplying thereto electrical energy through conductors 10 from a suitable source, not shown. To minimize the effect of source power variations, the filaments 7 and 9 are preferably connected in series, or suitable optical means may be used to obtain two light trains or paths from a single lamp or filament, in a manner well known in the art.

Arranged symmetrically in front of the lamps 3 and 5, as shown in the drawing, is a plurality of cells, of which cells 11 and 12 may be termed filter cells, 13 and 14 sample or absorption cells, and 15 and 16 detector cells.

The cells are preferably made of a suitable metal in the form of hollow cylinders, the bores therethrough being closed at either end in fluid-tight manner by means of transparent windows generally shown at 17.

Any material transparent to infra-red radiation may be used to make the windows 17, such as quartz, lithium fluoride, sodium chloride, silver chloride, etc., the choice of any particular material being governed by the region of the spectrum in which it is desired to operate. Thus, lithium fluoride, for example, cuts off any radiation having a wave length of more than 6.5 microns, silver chloride of more than about 20 microns, etc.

The detector cells 15 and 16 act essentially as means for converting or translating pressure variations or pulses into electric pulses or signals, that is, they act as microphones. Microphones of any suitable type, such as condenser, dynamic, crystal, etc., may be advantageously used for the purposes of this invention, which will however be described and illustrated for simplicity only with regard to one type, for example the condenser type microphones. In detector cells 15 and 16, the windows at the outer ends are replaced by membranes 19, made of a suitable resilient material, such for example as aluminum, having a thickness of about 0.001 inch or less. The membranes or diaphragms 19 separate the detector chambers proper from the electrode chambers 21 and 23 adjacent thereto, which house electrodes 22 and 24, capacitatively coupled with the diaphragms to form condensers, and spaced therefrom by a distance such as about 0.005 inch or less, a preferred spacing being of the order of .002 inch or less.

A measuring bridge or circuit, generally indicated at 30, is connected to the diaphragms 19 by a lead 31, and to the electrodes 22 and 24 by leads 32 and 34 through amplifiers 35 and 37, forming part of said circuit, said circuit being adapted, in a manner well known to those familiar with electric and electronic arts, to measure, compare, indicate and/or record the impulses or signals received from the detector cells 15 and 16.

Interposed between the light source and the various cells, is a light chopper or shutter mechanism comprising an element 40 rotatably mounted on a shaft 41 driven by an electric motor 43. The element 40 is most conveniently made in the form of a disc having a desired number of windows therethrough, or, as shown in Fig. 2, having portions or sectors thereof cut away to give unobstructed passage to the beams from the light source. The shutter disc itself is made of an opaque material, such as a metal, or of a transparent or translucent material having suitable light-filtering properties, such for example as lithium fluoride if it is desired to exclude only rays belonging to certain portions of the spectrum. It will be seen that by combining a proper motor speed with a proper number of windows or cut-away sectors in the shutter, any desired reasonable light-chopping or interrupting frequency may be achieved. For example, by using the shutter of Fig. 2 with a motor rotating at 600 R. P. M., light can be chopped, that is, alternately interrupted and admitted in synchronism to cells 11 and 12 at a frequency of 20 cycles per second, which is satisfactory for the purposes of the present method.

As stated above, an application of the present system lies in the analysis and the control of gaseous mixtures in industrial installations, wherein an accurate determination of the percentage of each of the components of certain reaction plant feed or other streams may be required. Thus, it may be necessary to determine and to record the relative percentages of some or any of the following components of a gaseous stream, which components are listed here only for illustration purposes: ethane, ethylene, propane, propylene, butylene, amylene, hexadiene, carbon dioxide, ammonia, etc. Each of said components may be present in said stream in admixture with one or more other gases or components, each of which may be of the absorbing type, such as those listed above, or of the non-absorbing type, such for example as nitrogen, oxygen, etc.

Figure 3:
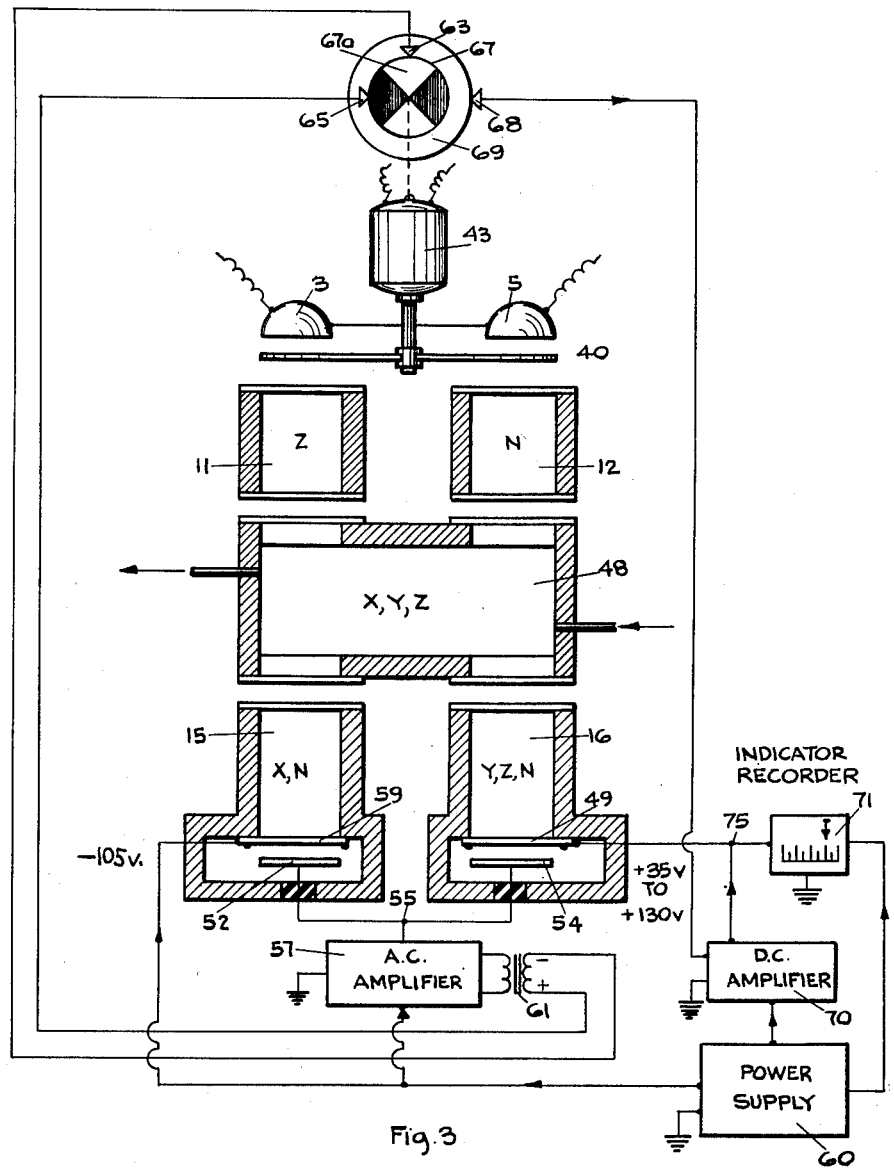
Fig. 3 shows a modification of the system of Fig. 1.

To illustrate an application of the present analyzer system, it will be assumed that it is desired to determine and to record the percentage of propylene (which may be denoted by X to follow the system of notation used hereinabove) in a stream comprising also substantial amounts of propane (Y), and either significant amounts or traces of ethylene (Z), which mixture, or a sidestream thereof can be, if desired, continuously circulated through the absorption cells 13 and 14 by means of pipes 45, 47 and 49, the composition of the material within these cells being identical. In fact, it is understood that a single absorption cell may be substituted for cells 13 and 14 and positioned in proper register between the filter cells 11, 12 and the detector cells 15 and 16, as shown in Fig. 3.

The filter cells 11 and 12 are filled to a pressure such as 1 atmosphere with gases Z and N respectively, N being a neutral gas, that is, a gas having substantially no absorptive power for the rays emitted by the light source, such for example as nitrogen, helium, argon, etc. In certain cases, such as in the analysis of multi-component mixtures, each of the filters is filled with a different absorbing component. In other cases, for example, when analyzing a mixture of two components, or a mixture of three components wherein the third component has no interfering bands with the other two, the filter cells may, if desired, be omitted from the present system.

The detector cell 15 is filled with a pure (although preferably diluted, as will be explained below) sample of the principal component X, while the detector cell 16 is filled with a mixture of the other two components Y and Z.

Since it is usually desirable to use a relatively low partial pressure of absorbing gas in order to realize maximum discrimination, that is, to obtain sharp absorption bands, and since pressure broadening is not a significant factor with most gases, it is possible to obtain a most efficient conversion of radiant energy to useful energy by filling a detector cell with a relatively small proportion of an absorbing gas component to a relatively low partial pressure, and then admitting to said cell a relatively large proportion of a neutral non-absorbing gas to raise the total pressure in said detector cell to a desired or permissible value, such for example as one atmosphere. Thus, the component X in cell 15 and the components Y and Z in cell 16 are admixed in relatively minor proportions such as from 5 to 50 per cent, with relatively major proportions, such as from 50 to 95 per cent, of a nonabsorbing gas, such as nitrogen, helium, argon, etc. The use of argon is particularly advantageous because it has an exceptionally high ratio of specific heats (ratio of specific heat at constant pressure to specific heat at constant volume). It can be shown that in a system such as described herein, the output voltage of a detector varies in direct proportion to the quantity by which the ratio of the specific heats of the gas in said detector exceeds unity. The procedure described is especially advantageous when the absorbing gas is a hydrocarbon having four or five carbon atoms per molecule, since these gases have extremely low specific heat ratios.

It has been found that the use of a diluent neutral gas in the detector cell increases the sensitivity of the present system to such a degree as to make it possible to use not only detector cells filled with different absorbing gases, such as X, Y and Z in the examples above, but also detector cells filled with the same absorbing gas used at a different partial pressure in each cell.

Such procedure may have considerable advantages in certain cases. Thus, for example, the vent gas stream of an ethyl chloride plant usually comprises the following components: $C_2H_4$ (60 to 5%), $CH_4$ (20 to 2%), $C_2H_6$ (15 to 1%), $C_2H_2$ (3 to 0.5%), $C_3H_8$ (2 to 0%), $C_2H_5Cl$ (25 to 2%), HCl (80 to 20%), heavies (0.1 to 0%). The presence of five major components in varying concentrations, as well as that of two minor components, makes it impractical, when analyzing this vent gas, to use the normal technique of measuring the ratio of ethylene to the sum of the other components. However, infra-red analysis can be successfully carried out in this case by using two detector cells both filled with ethylene and argon, the respective partial pressure being, for example, 200 mm. of ethylene and 560 mm. of argon in one cell, and 50 mm. of ethylene and 710 mm. of argon in the other cell. In the present specification and claims, therefore, the term "different gas" is understood to refer both to a gas chemically different from a gas in another cell, and to a gas used at a different partial pressure than a gas in another cell. It is understood that the electrode cells 21 and 23 are filled with the same composition as the detector cell of which they form respectively a part. Small communication orifices or channels, not shown, are provided for this purpose between said cells. These communication channels are however of very small diameter or high flow impedance to prevent sensitivity loss at the frequency of the chopper.

The light sources 3 and 5 are thereupon energized to emit rays in the infra-red spectrum, and the chopper 49, driven by the motor 43, is run to interrupt these rays at a desired frequency, such for example as 20 cycles per second.

It is well understood by those familiar with infra-red analysis methods that, as has been briefly explained above, the infra-red radiations have, in their spectrum, rays of X, Y, Z frequencies, that is, rays which have a particular capability of becoming absorbed by gases denoted here by X, Y and Z respectively, by transferring their energy to said gases in the form of heat. It is also well understood that the gas denoted by X is relatively insensitive to the frequency Y of the radiated spectrum, except possibly for overlapping bands. That is, it will absorb relatively little energy of the frequency Y, and will have very little heating effect imparted thereto by said frequency, said statement holding reciprocally true for all gases and frequencies mentioned.

Considering, therefore, the light path through the cells 11, 13 and 15, it will be seen that the detector cell 15, being filled with gas X, will be responsive substantially only to the radiation energy $E_x$ of the rays of frequency X radiated by light source 3 minus a fraction thereof, $e_x$, absorbed by the component X of the stream in sample cell 13, that is, to $E_x - e_x$. Since the radiation $e_x$ absorbed in the sample or absorption cell 13 is a function of the concentration of the component X in said cell, it is obvious that the amount of radiation reaching the detector cell 15 and capable of being absorbed by the gas in said cell to produce a heating effect is an inverse function of the concentration of the component X in the mixture of the stream being analyzed.

The same reasoning obviously applies with regard to components Y and Z reaching the detector 16.

Since the action of the shutter 40 results in interrupting the light beams a predetermined number of times per second, the gaseous contents in the detector cells are subjected to intermittent radiation accompanied by heating. The heating of the gases in said cells causes a proportional expansion effect, which tends to displace the diaphragm 19 towards the electrodes 22 and 24, thereby creating pulsating capacitive effects in the circuits thereof, which effects are detected, amplified, and compared, measured or recorded in well known manner by the measuring circuit.

Thus, since the signals or impulses originating in cell 15 are an inverse function of the concentration of the component X in the stream being analyzed, while the signals or impulses originating in cell 16 are an inverse function of the concentration of components Y and Z in said stream, the recorder 30 may be readily made, by a suitable calibration, to compare or register the relative concentrations of said components in the stream, which is usually sufficient for purposes of normal plant control. Should it be desired to measure absolute concentrations of said components, this can also be readily achieved by means of the present system without involving any changes in the principle or even the organization or operation thereof other than, for example, a recalibration of the recorder, the grounding of one of the detector cells, the use of a plurality of recording elements in the recorder, etc., as will be well understood by those familiar with electrical and electronic instrumentation.

It is understood that the electric indicating or recording system of Fig. 1 is purely schematic and illustrative, and that any other electric or electronic circuit suitable for the purpose may be used instead. A recording circuit giving particularly favorable results is shown in Fig. 3 to illustrate this point.

The analytical and optical portions of the system shown in Fig. 3 are the same as in Fig. 1, except that a single absorption cell 48 is shown instead of the two cells 13 and 14.

The electrodes 52 and 54 of the detectors are connected together at a common point 55 to the input of the A. C. amplifier 57. A fixed negative polarizing voltage having a value such for example as minus 105 volts is applied to the diaphragm 59 of cell 15 from a suitable power supply 60, while a positive polarizing voltage automatically varying between such values as for example 35 to 135 volts is applied to the diaphragm 49 of the cell 16 in a manner to be described hereinbelow.

The output of the A. C. amplifier 57 is connected, through a transformer 61, to a commutator device of any suitable type, such for example, as one comprising a cam and breaker point arrangement, or a rotating disc 67 and a stationary conductor ring 69. The disc 67 has two metallic conductor sectors 67a, and two insulator sectors 67b. The brushes 63 and 65, connected to the output terminals of the amplifier 57, are positioned in contact with the disc 67 only, and are displaced from each other by 90 physical or 180 electrical degrees, so that when one of said brushes is in contact with a conductor sector, the other brush is in contact with an insulator sector. The ring 69 and disc 67 being in electrical contact with each other, the third brush 68 of the commutator is thus alternately in contact (through conductor ring 69 and conductor sectors 67a) with either the brush 63 or the brush 65 as the disc 67 rotates. The rotation of the disc 67 is synchronized with the rotation of the shutter 40 in such fashion, for example, that when the shutter 40 interrupts the beams directed to the cells, the brush 63 is in contact with one of the insulator sectors 67b.

The brush 68 is connected to the input of the D. C. amplifier 70, whose output is connected to the diaphragm 59 of cell 16 to impress on said diaphragm a variable positive polarizing voltage of about from 35 to 130 volts. The output of amplifier 70 is also connected to an indicator or recorder 71, which registers the ratio of the polarizing voltages, this being a measure of the ratio between the components X and Y (or Y plus Z) in the stream passing through the absorption cell, as will be seen below.

The operation of the system of Fig. 3 may be briefly outlined as follows:

During each cycle of illumination of the cells, a pulse is produced in each of the detector cells 15 and 16. Due to the negative polarization of cell 15 and the positive polarization of cell 16, these pulses are of opposing potentials. In case of equal pressure pulses in cells 15 and 16 and equal magnitudes of polarizing voltages applied thereto, the potential of the junction point 55, or the input to the A. C. amplifier 57 is thus zero.

If, however, these pulses become uneven (due, for example, to a change in the percentage of the component X in the mixture of the absorbing cell or cells), a potential will appear at point 55, the sign or polarity of said potential depending on whether the pulse from the positively polarized cell 16 is stronger than that from the negatively polarized cell 15.

The polarity of the potential applied to the input of A. C. amplifier is suitably reflected by the instantaneous polarity of its output as appearing at the transformer 61 (as illustrated by the plus and minus signs in the drawing), whereby the A. C. amplifier 57 operates to discriminate between the pulses originating in cell 15 and those originating in cell 16.

The amplified pulses from the output of the amplifier 57 are rectified by means of the commutator 67 in the manner outlined above, and the direct current is transmitted from brush 68 to the input of the D. C. amplifier 70. Variations in this input current cause corresponding variations in the potential of the output of the D. C. amplifier, and these variations, applied to point 75 and thus to the diaphragm 59 of cell 16, serve to change automatically the polarizing potential applied thereto in such a direction as to decrease the difference between the absolute values of the electrical pulses originating in cells 15 and 16, and thus to bring the potential at point 55 back to zero. The potential at point 75, necessary for effecting this rebalancing, is at the same time recorded by the recorder 71, which may be suitably calibrated to indicate the desired ratios of the components X and Y (or Y plus Z), or the absolute concentrations of said components.

Figure 4:
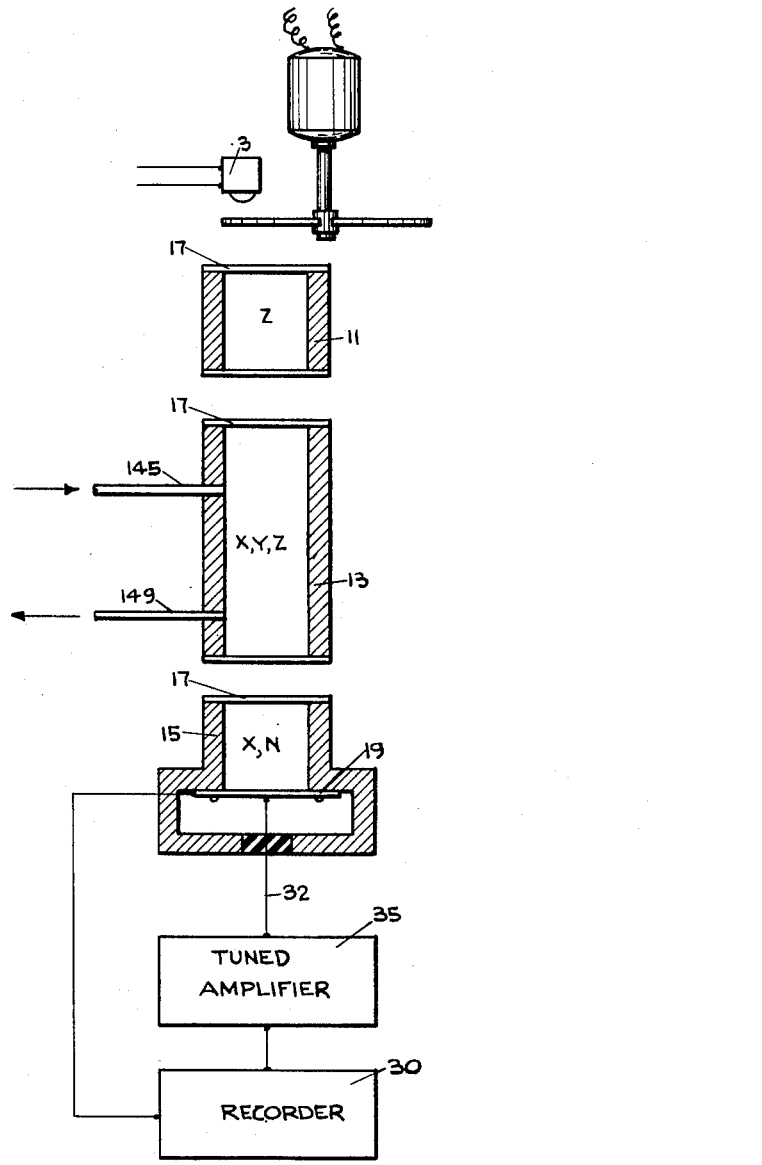
Fig. 4 shows another modification of the system of Fig. 1, said modified system employing a single detector cell.

Since, as stated above, the effectiveness of the detector cell is greatly increased by the use therein of a diluent gas, it becomes sometimes possible, when using such diluent gas to dispense with the relatively elaborate double beam, double cell arrangement described hereinabove, and to use a simplified single cell arrangement instead. This is particularly desirable in applications where the component to be measured is present in moderately high concentration, and where only one or two components absorb infra-red radiation, or there is little or no overlapping of absorption bands. In such cases, the single-beam, single detector cell arrangement diagrammatically shown in Fig. 4 may be advantageously used. It will be seen that this arrangement is equivalent to that of Fig. 1, except that only one light source 3, one absorption cell 13 and one detector cell 15 are used, the gas to be analyzed being admitted to the absorption cell and withdrawn therefrom by means of pipes 145 and 149. The gas mixture in the detector cell consists of any desired major proportion of a diluent non-absorbing gas N, and of a minor proportion of an absorbing gas X. In cases when it may be desired to obtain the sum of two or more absorbing components in a stream (e. g., the sum total of olefins), the detector cell may be filled with a mixture of said components in addition to the neutral diluent.

It is further understood that the signals used to energize the recorder may also be readily applied for purposes of remote automatic control of plant installations determining the properties of a stream or product, as diagrammatically illustrated in Fig. 1 with regard to a container 40 controlled by a relay operated automatic valve, energized by signals from the recorder to control the rate of flow in a conduit 41 which may carry any of the stream or feeds analyzed in the manner described hereinabove.

It is also understood that although the present invention has been described for simplicity with regard to a system involving one or two detector cells, said system may be modified in a manner readily understood by those familiar with the art in such a manner as to permit the use of more than two cells in analyzing multi-component fluid streams.

Furthermore, although in the above description the fluid streams being analyzed were gaseous mixtures, the present invention is likewise suited for the analysis of liquid streams or mixtures. Thus, the fluid circulated in the absorption cells 13 and 14, which in such case should be of reduced axial length, may be a liquid mixture, although the detector cells should in this case also be filled with components of said mixture in gaseous form. Alternatively, a liquid mixture held in container 40 may have a non-absorbing gas stream bubbled therethrough and delivered through pipe 45 to the absorption cells for the analysis of the vaporized components of said mixture. The present application is a continuation-in-part of our copending application Serial No. 123,482, filed October 25, 1949.

We claim as our invention:

1. In an infra-red analyzing system, light source means for radiating a spectrum comprising infra-red rays along a plurality of optical paths, absorption cell means positioned across said paths, means for admitting to said cell means a fluid mixture, windows in said cell means aligned to permit the rays traveling along said paths to traverse said cell means, a plurality of detector cells, one of said detector cells being positioned in each of the paths of the rays traversing the absorption cells, each of said detector cells containing at least one component of said fluid mixture different from those in any of the other detector cells, window means in each detector cell for admitting thereto rays passing through the absorption cell means, means for cyclically and simultaneously interrupting the rays radiated by said source to all of said detector cells, whereby the fluid contents of each detector cell are subjected to simultaneous cyclic heating, microphone means in each detector cell for translating pressure variations due to said heating into electric pulses, and measuring circuit means electrically connected to said microphone means for giving indications proportional to said pressure pulses.

2. In an infra-red analyzing system, light source means for radiating a spectrum comprising infra-red rays along two optical paths, absorption cell means positioned across said two paths, means for admitting to said absorption cell means a fluid mixture comprising at least two heteratomic components, windows in said cell means aligned to permit the rays traveling along said paths to traverse said cell means, a detector cell positioned in each of the two paths of rays passing through said absorption cell means, each of said detector cells containing at least one component of said fluid mixture different from those in the other detector cell, window means in each detector cell for admitting thereto the rays passing through the absorption cell means, means for cyclically and simultaneously interrupting the rays radiated by said source to the two detector cells, whereby the fluid contents of each detector cell are subjected to simultaneous cyclic heating, microphone means in each detector cell for translating pressure variations due to said heating into electric pulses, and measuring circuit means electrically connected to said microphone means for giving indications proportional to said pressure pulses.

3. In an infra-red analyzing system, light source means for radiating a spectrum comprising infra-red rays along a plurality of optical paths, absorption cell means positioned across said paths, means for admitting to said cell means a fluid mixture, windows in said cell means aligned to permit the rays traveling along said paths to traverse said cell means, a plurality of detector cells, one of said detector cells being positioned in each of the paths of the rays traversing the absorption cells, each of said detector cells containing at least one component of said fluid mixture different from those in any of the other detector cells, window means in each detector cell for admitting thereto rays passing through the absorption cell means, means for cyclically and simultaneously interrupting the rays radiated by said source to all of said detector cells, whereby the fluid contents of each detector cell are subjected to simultaneous cyclic heating, electrode and diaphragm elements arranged within each detector cell to form a condenser, said diaphragm element being movable in response to pressure variations caused within the detector cell by said cyclic heating, and measuring circuit means connected to said condensers for indicating changes in the capacities thereof due to the motion of said diaphragm elements.

4. In an infra-red analyzing system, light source means for radiating a spectrum comprising infra-red rays along two optical paths, absorption cell means positioned across said two paths, means for admitting to said absorption cell means a fluid mixture comprising at least two heteratomic components, windows in said cell means aligned to permit the rays traveling along said paths to traverse said cell means, a detector cell positioned in each of the two paths of rays passing through said absorption cell means, each of said detector cells containing at least one component of said fluid mixture different from those in the other detector cell, window means in each detector cell for admitting thereto the rays passing through the absorption cell means, rotatable shutter means for cyclically interrupting the light rays simultaneously along said two paths, whereby the fluid contents of each detector cell are subjected to simultaneous cyclic heating, microphone means in each detector cell for translating pressure variations due to said heating into electric pulses, and measuring circuit means electrically connected to said microphone means for giving indications proportional to said pressure pulses.

5. The system of claim 1, comprising filter cell means interposed in at least one of the ray paths between the light source and the absorption cell means, window means in said filter cell means aligned to permit the rays traveling along said path to traverse said filter cell, said filter cell containing a component of the fluid mixture different from that contained in the detector cell positioned in the same ray path.

6. The system of claim 1, wherein a component of the fluid mixture is placed in the detector cell in a minor concentration in admixture with a major concentration of a gas having no absorbing power with regard to any of the ray frequencies within the spectrum radiated by the light source.

7. In an infra-red analyzing system, light source means for radiating a spectrum comprising infra-red rays along a plurality of at least two optical paths, one detector cell positioned in each of said paths of rays, each of said detector cells containing a fluid mixture consisting of a major portion of a non-absorbing component and a minor portion comprising at least one heteratomic absorbing component different from any of the heteratomic components of the fluid mixture contained in any of the other detector cells, absorption cell means interposed along said ray paths between said light source means and said detector cells, means for admitting to said absorption cell means a fluid mixture comprising all the heteratomic absorbing components present in said detector cells, window means in said absorption and detector cell means aligned with each other to admit rays along said paths to said detector cells, means for cyclically and simultaneously interrupting the rays radiated by said source along said paths, whereby the fluid contents of the detector cells are subjected to simultaneous cyclic heating, microphone means in each detector cell for translating pressure variations due to said heating into electric signals, and means in circuit with said microphone means for measuring said signals.

8. In an infra-red analyzing system, light source means for radiating a spectrum comprising infra-red rays along two optical paths, a detector cell positioned in each of said two paths of rays, each of said detector cells containing a fluid mixture having at least one heteratomic component different from any of the heteratomic components of the fluid mixture contained in the other detector cell, absorption cell means interposed along said two paths between said light source means and said two detector cells, means for admitting to said absorption cell means a fluid mixture comprising at least one component contained in one of said detector cells and at least one component contained in the other detector cell, window means in said absorption and said detector cell means aligned with each other to admit rays along said two paths to said two detector cells, means for cyclically and simultaneously interrupting the rays radiated by said source along said two paths, whereby the fluid contents of two detector cells are subjected to simultaneous cyclic heating, microphone means in each detector cell for translating pressure variations due to said heating into electric signals, and means in circuit with said microphone means for measuring said signals.

9. In an infra-red analyzing system, light source means for radiating a spectrum comprising infra-red rays, detector cell means positioned to intercept said rays, said detector means containing mixed fluids consisting of a major portion of a non-absorbing component and a minor portion comprising at least one heteratomic selectively absorbing component, absorption cell means interposed in the path of said rays between said light source means and said detector cell means, means for admitting to said absorption cell means a fluid mixture comprising a plurality of heteratomic absorbing components, said mixture including any heteratomic component present in said detector cell means, window means in said absorption and detector cell means aligned with each other to admit said rays to said detector cell means through said absorption cell means, and means in said detector cell means for measuring temperature variations therein due to the heating effect of said rays.

10. In an infra-red analyzing system, light source means for radiating a spectrum comprising infra-red rays along a plurality of at least two optical paths, one detector cell positioned in each of said paths of rays, each of said detector cells containing a fluid mixture consisting of a major portion of a non-absorbing component and a minor portion comprising at least one heteratomic absorbing component different from any of the heteratomic components of the fluid mixture contained in any of the other detector cells, absorption cell means interposed along said ray paths between said light source means and said detector cells, means for admitting to said absorption cell means a fluid mixture comprising all the heteratomic absorbing components present in said detector cells, window means in said absorption and detector cell means aligned with each other to admit rays along said paths to said detector cells, and means in said detector cell means for measuring temperature variations therein due to the heating effect of said rays.

11. In an infra-red analyzing system, light source means for radiating infra-red rays along at least two optical paths, a detector cell positioned in each of said paths, each of said detector cells containing a fluid mixture consisting of a major portion of a non-absorbing component and a minor portion comprising at least one heteratomic absorbing component held in said cell at a different partial pressure than the same heteratomic component held in any one of the other detector cells, absorption cell means interposed along said ray paths between said light source means and said detector cells, means for admitting to said absorption cell means a fluid mixture comprising all the heteratomic absorbing components present in said detector cells, window means in said absorption and detector cell means aligned with each other to admit rays along said paths to said detector cells, and means in said detector cell means sensitive to temperature variations therein due to the heating effect of said rays.

12. In an infra-red analyzing system, light source means for radiating infra-red rays along two optical paths, one detector cell positioned in each of said paths of rays, each of said detector cells containing a fluid mixture consisting of a major portion of a non-absorbing component and a minor portion comprising at least one heteratomic component different from any of the heteratomic components of the fluid mixture contained in the other detector cell, absorption cell means interposed along said ray paths between said light source means and said detector cells, means for admitting to said absorption cell means a fluid mixture comprising all the heteratomic absorbing components present in said detector cells, window means in said absorption and detector cell mean aligned with each other to admit rays along said paths to said detector cells, and means in said detector cell means for measuring temperature variations therein due to the heating effect of said rays.

13. In an infra-rad analyzing system, light source means for radiating infra-red rays, a detector cell positioned in the path of said rays, said detector cell containing a mixture consisting of a major portion of a non-absorbing component and minor portion comprising at least one heteratomic selectively absorbing component, an absorption cell interposed in said path between said light source means and said detector cell, said absorption cell comprising any heteratomic component present in the detector cell, window means in said absorption and detector cell means aligned with each other to admit rays along said paths to said detector cells, and means in said detector cell means for measuring temperature variations therein due to the heating effect of said rays.

14. In an infra-red analyzing system, light source means for radiating a spectrum comprising infra-red rays, detector cell means positioned to intercept said rays, said detector means containing mixed fluids consisting of a major portion of a non-absorbing fluid component having a high ratio of specific heats and a minor portion comprising at least one heteratomic absorbing component, absorption cell means interposed in the path of said rays between said light source means and said detector cell means, means for admitting to said absorption cell means a fluid mixture comprising a plurality of heteratomic absorbing components, said mixture including any heteratomic component present in said detector cell means, window means in said absorption and detector cell means aligned with each other to admit said rays to said detector cell means through said absorption cell means, and means in said detector cell means for measuring temperature variations therein due to the heating effect of said rays.

15. The system of claim 14, wherein the non-absorbing fluid component having a high ratio of specific heats is argon, said argon being used in proportions of at least 50 per cent.

References Cited in the file of this patent

UNITED STATES PATENTS

| Number | Name | Date |
|---|---|---|
| 2,550,419 | Martin | Apr. 24, 1951 |
| 2,573,870 | Pfund | Nov. 6, 1951 |
| 2,583,221 | Martin | Jan. 22, 1952 |